(12) United States Patent
Walters

(10) Patent No.: US 10,254,114 B2
(45) Date of Patent: Apr. 9, 2019

(54) TERRAIN SENSOR NODE SYSTEM AND METHOD

(71) Applicant: Mark D Walters, Colleyville, TX (US)

(72) Inventor: Mark D Walters, Colleyville, TX (US)

(73) Assignee: Williams RDM, Inc., Fort Worth, TX (US)

(*) Notice: Subject to any disclaimer, the term of this patent is extended or adjusted under 35 U.S.C. 154(b) by 97 days.

(21) Appl. No.: 15/632,288

(22) Filed: Jun. 23, 2017

(65) Prior Publication Data
US 2018/0347975 A1    Dec. 6, 2018

Related U.S. Application Data

(60) Provisional application No. 62/512,615, filed on May 30, 2017.

(51) Int. Cl.
| | | |
|---|---|---|
| G01B 21/30 | (2006.01) | |
| G01D 11/24 | (2006.01) | |
| G01D 11/30 | (2006.01) | |
| H02S 40/38 | (2014.01) | |
| H02J 7/35 | (2006.01) | |

(52) U.S. Cl.
CPC .......... *G01B 21/30* (2013.01); *G01D 11/245* (2013.01); *G01D 11/30* (2013.01); *H02J 7/35* (2013.01); *H02S 40/38* (2014.12)

(58) Field of Classification Search
CPC ...... G01B 21/30; G01D 11/245; G01D 11/30; H02J 7/35; H02S 40/38
See application file for complete search history.

(56) References Cited

U.S. PATENT DOCUMENTS

| | | | | |
|---|---|---|---|---|
| 2006/0033674 A1* | 2/2006 | Essig, Jr. | ............... | B01D 61/06 |
| | | | | 343/912 |
| 2017/0329351 A1* | 11/2017 | Park | ...................... | A01B 79/005 |
| 2018/0259373 A1* | 9/2018 | Staton | .................. | G01D 11/245 |

OTHER PUBLICATIONS

Pathfinder Perimeter Security System; web page 6 pages; printed Aug. 13, 2017; http://pathfinder.ara.com/perimeter-earn-more/?utm_campaign=FY17Q2%20-%20Lead%20Generation%20Campaign&utm_source=ppc&gclid=Cj0KEQjwxbDIBRCL99WIs-nLicoBEiQAWroh6gUM-a6YMzrW4r893KZwK0FrHvBZZONWnyPESepUmOAaAg1b8P8HAQ.
Southwest Microwave Solutions; web page; 2 pages; printed Aug. 13, 2017; http://www.southwestmicrowave.com/products.
Senstar systems; web page; 3 pages; printed Aug. 13, 2017; http://senstar.com/.
Argus; web page; 3 pages; printed Aug. 13, 2017; http://www.i-a-i.com/?product/argus.
MicroObserver(TM) UGS System Brochure, 3 pages, pdf saved-printed Nov. 17, 2017; https://www.textronsystems.com/missions/border-security.

(Continued)

*Primary Examiner* — Francis C Gray
(74) *Attorney, Agent, or Firm* — Morani Patent Law PC

(57) ABSTRACT

A terrain sensor node system and method are provided herein. The terrain sensor node can be employed without hands on placement. Solar power is facilitated and contributes to service life and reliability. A robust housing is capable of aerial drop installation. A domed top and a rounded weighted bottom combine to form a housed sensor that is capable of righting itself after landing. A transparency in the upper housing enables the harnessing of solar power in a righted sensor. An antenna withstands aerial sensor deployment and rotates to a workable orientation without user intervention.

41 Claims, 13 Drawing Sheets

(56) References Cited

OTHER PUBLICATIONS

Spider(TM) Networked Munition System; 2 pages, pdf saved-printed Nov. 17, 2017; https://www.textronsystems.com/missions/border-security.
Micro Observer(TM) Unattended Ground Sensor System MO-1045 Sensor; 1 page; pdf saved-printed Nov. 17, 2017; https://www.textronsystems.com/missions/border-security.
Micro Observer(TM) Base & Border Protection Unattended Ground Sensor System MO-2730 Sensor; 1 page pdf saved-printed Nov. 17, 2017; https://www.textronsystems.com/missions/border-security.
Disposable Multi-Sensor Unattended Ground Sensor Systems for Detecting Personnel; 42 pages; NATO AC/323 (SET-158)TP/578; published Feb. 2015.

* cited by examiner

TERRAIN SENSOR NODE SYSTEM AND METHOD

CROSS REFERENCE TO SUBSEQUENT RELATED APPLICATIONS

This application claims priority to U.S. Provisional Patent Application No. 62/512615, filed 30 May 2017, the entire contents of which are incorporated herein by reference.

FIELD OF THE INVENTION

The present invention relates to field sensors and more particularly, to sensors capable of aerial deployment.

BACKGROUND OF THE INVENTION

Conventional sensors come in a multitude of types and configurations for mounting on a desired product or in a desired location. Conventional sensors may be installed to form a perimeter, within a building or within an enclosure, for sensing intrusions therein. Many networks, comprising different sensor-types, can be readily installed in industrial applications. Every day sensors include the line of site sensors across the garage door opening. More complex conventional sensor systems may include sensors mounted atop fence lines, having a three dimensional field of view. Still other conventional sensors may be buried at installation. Hands on sensor placement can provide sensor location out of reach of intruders, or out of the way of non-intruding personnel. Mounting of the sensor can provide a desired sensor orientation and, in turn, the desired sensor field of view.

Constructing a vast sensor network across a varying terrain brings challenges that the industrial applications and the residential applications need not address. In a security border application, a large number of sensor installations may be desired. Installation in some locations may be complicated by access due to remoteness. In still other locations, sensor placement may be in a hazardous environment, where user access is either not possible or not safe.

While battery power may provide a viable solution for remote sensors in a short term application, the longer service life afforded by photovoltaic power may be desirable.

It may be desirable for applications such as border security to provide a sensor system and network that facilitates field installation and a long service life.

SUMMARY OF THE INVENTION

The present invention addresses some of the issues presented above by providing a self-righting sensor node capable of withstanding aerial deployment. Aspects of the present invention are provided for summary purposes and are not intended to be all inclusive or exclusive. Embodiments of the present invention may have any of the aspects below.

One aspect of the present invention is to provide a sensor system that need not be mounted.

One aspect of the present invention is to construct a sensor node robust enough to withstand an aerial deployment.

Another aspect of the present invention is to provide a packaged, enclosed, and/or self-contained sensor node.

Another aspect of the present invention is to provide a sensor with long service life.

Another aspect of the present invention is to provide photo cell power, or recharging of batteries using light energy, or solar cell power, for outdoor collection of sun light energy and using the light energy or storing the energy by recharging batteries.

Another aspect of the present invention is to provide rechargeable battery power with solar cell recharging of the batteries.

Another aspect of the present invention is to provide solar cell capacity without requiring hands on placement or mounting.

Yet another aspect of the present invention is to provide a self-righting sensor node.

Another aspect of the present invention is relative ease of use in employment of the present invention in field applications.

Another aspect of the present invention is to provide a protective cage around a top surface of the sensor node.

Another aspect of the present invention is to provide a sensor enclosure weighted and configured to roll into a desired orientation upon landing.

Yet another aspect of the present invention is to provide a robust sensor housing that protects the electronics from impact.

Another aspect of the present invention is to provide ultraviolent protection from sun exposure.

Another aspect of the present invention is to use a nickel-titanium alloy, hereafter maybe referred to as "Nitinol," wires for flexibility to create a dome shape.

Another aspect of the present invention is to use Nitinol metal wire dome to provide impact protection for the sensor node.

Another aspect of the present invention is to use urethane potting to contribute to impact resistance.

Another aspect of the present invention is to use a wire dome that can absorb impact and regain or maintain its desired dome shape.

Those skilled in the art will further appreciate the above-noted features and advantages of the invention together with other important aspects thereof upon reading the detailed description that follows in conjunction with the drawings.

BRIEF DESCRIPTION OF THE FIGURES

For more complete understanding of the features and advantages of the present invention, reference is now made to the detailed description of the invention along with the accompanying figures, wherein.

DETAILED DESCRIPTION OF THE INVENTION

The invention, as defined by the claims, may be better understood by reference to the following detailed description. The description is meant to be read with reference to the figures contained herein. This detailed description relates to examples of the claimed subject matter for illustrative purposes, and is in no way meant to limit the scope of the invention. The specific aspects and embodiments discussed herein are illustrative of ways to make and use the invention, and are not intended to limit the scope of the invention. Same reference numbers across figures refer to like elements for ease of reference. Reference numbers may also be unique to a respective figure or embodiment.

Figure 1:
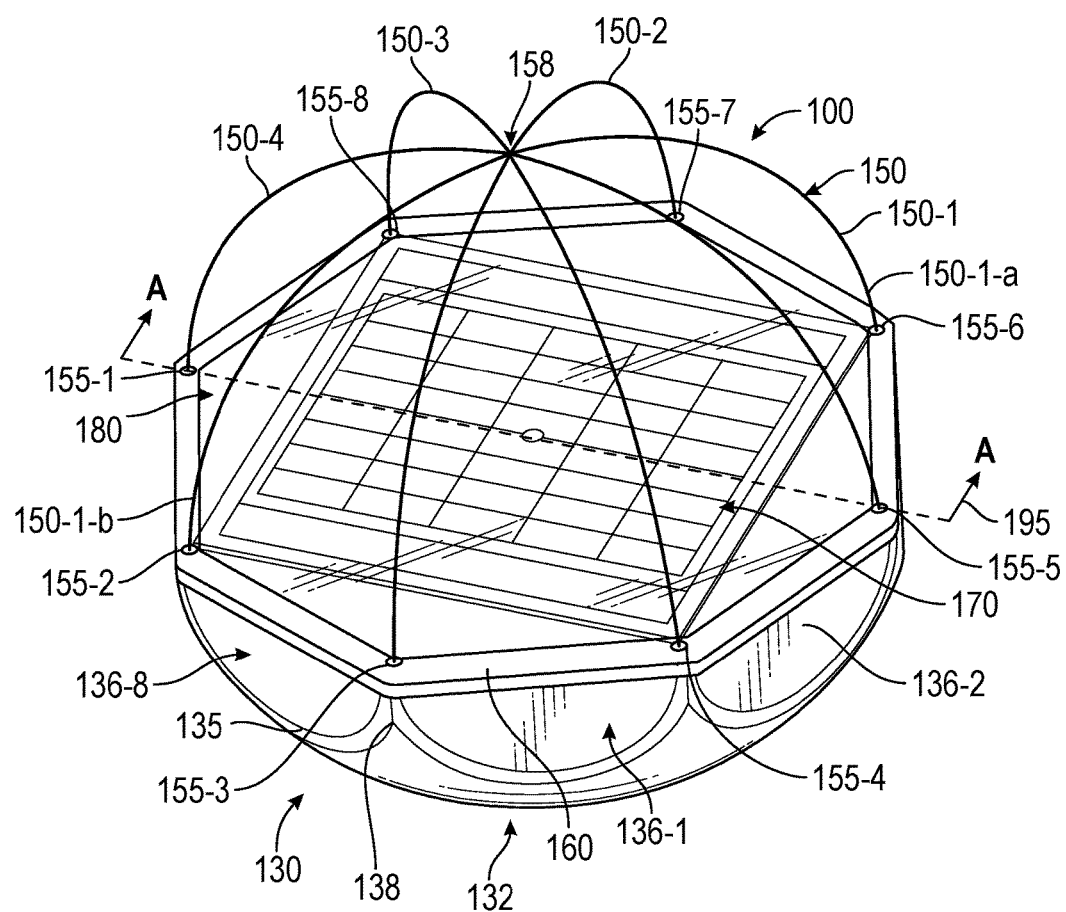
FIG. 1 is front perspective view of a terrain sensor node, in accordance with an exemplary embodiment of the present invention.

FIG. 1 is a front perspective view of a terrain sensor node, in accordance with an exemplary embodiment of the present invention. Turning to FIG. 1, the sensor assembly is shown in its upright orientation. The sensor assembly 100 has base 130 with a rounded bottom surface 132. The rounded bottom 132 rises into sidewalls 136 that form an octagon of eight sides, where three sides are shown 136-8, 136-1, and 136-2. Nickel-titanium alloy wires 150-1-150-4, more particularly NITINOL (so named for nickel-titanium alloy discovered at Naval Ordinance Laboratory), span across a top of the base 130 to form a dome. In accordance with an exemplary embodiment, nitinol wires 150-1 to 150-4 are bent into a semi-circle before being anchored 155-1 to 155-8 across an upper octagon surface 180 of the base. In accordance with an exemplary embodiment, a first wire is anchored across the octagon 155-6 to 155-2 at 180 degrees separation from end to end 150-1-a to 150-1-b. In like fashion, remaining wires 150-2, 150-3, and 150-4 are fastened across the octagon 180 at anchor points 155-7 to 155-3, 155-8 to 155-4, and 155-1-155-5, respectively. Each wire crosses a center 158 of the octagon 180 forming a dome. The dome center is shown in more detail in FIG. 6. Returning to FIG. 1, a chamfered edge 135 accommodates the transition from the rounded base 132 to the sidewalls 136-2, 136-1, and 136-8. A solar array 170 is shown atop the base 130 and beneath the wire dome 150. Anchors 155-1-155-8 are mounted into an octagon metal ring, not shown. Across a diameter of the sensor assembly 100, cross sectional view line A-A 195 is shown.

Figure 2:
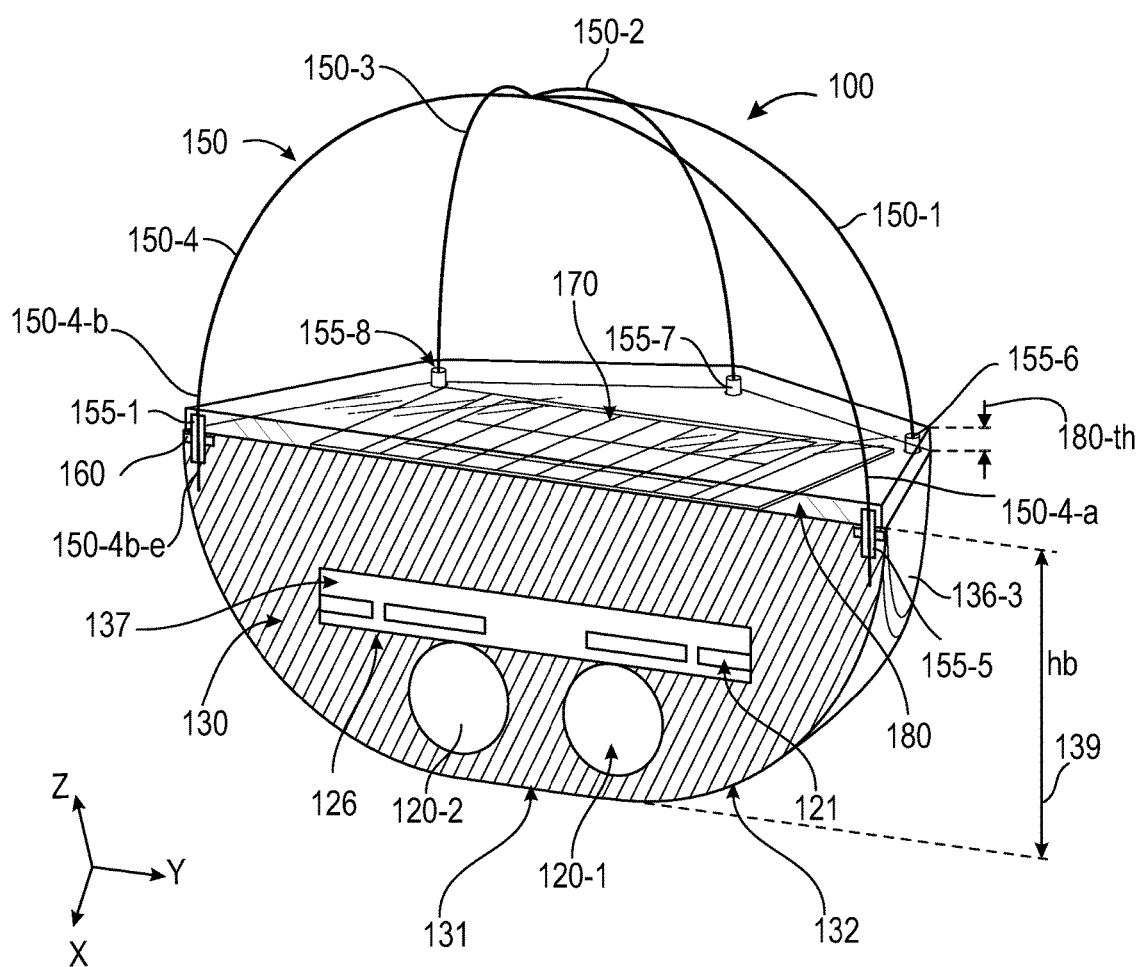
FIG. 2 is a cross sectional view of the terrain sensor node in FIG. 1 taken along line A-A, in accordance with an exemplary embodiment of the present invention.

FIG. 2 is a cross sectional view of the terrain sensor node in FIG. 1 taken along line A-A, in accordance with an exemplary embodiment of the present invention. Wire 150-4 is shown in the foreground secured into anchors 155-1 and 155-5 at ends 150-4-b and 150-4-a, respectively. Anchors 155-1 and 155-5 are shown secured to octagon metal ring 160. The metal ring 160 is described in more detail with reference to FIG. 3. Referring again to FIG. 2, in accordance with an exemplary embodiment, anchors 155-1, 155-8, 155-7, 155-6, 155-5 are crimp ferrules. Extending through the crimp ferrule on an underside −Z, is a stripped wire 150-4b-e for connection to a circuit board assemble 126. The base 130 has a height 139, which is about 8 centimeters in accordance with an exemplary embodiment. A flat side face 136-1 of the base 130 can be seen in the present view. The flat bottom surface 131 of the base 130 can be seen in this cross sectional view. The base curves 132 from the flat bottom surface 131 upwards +Z and into the flat sidewalls, where one sidewall 136-1 can be seen in this view. Two batteries 120-1, 120-2 are shown beneath a circuit board assembly cavity 137. In accordance with an exemplary embodiment two N cell 1.5 volt batteries are used to provide power to the circuit board assembly 126. Also shown is an integrated circuit chip 121, a component on the circuit board 126. The octagon metal ring 160 is shown embedded in the base 130 at an upper +Z position. Mounted atop +Z the base 130 is a solar panel 170. Covering a top +Z of the base 130 and the solar panel 170 is a clear layer 180.

Figure 3:
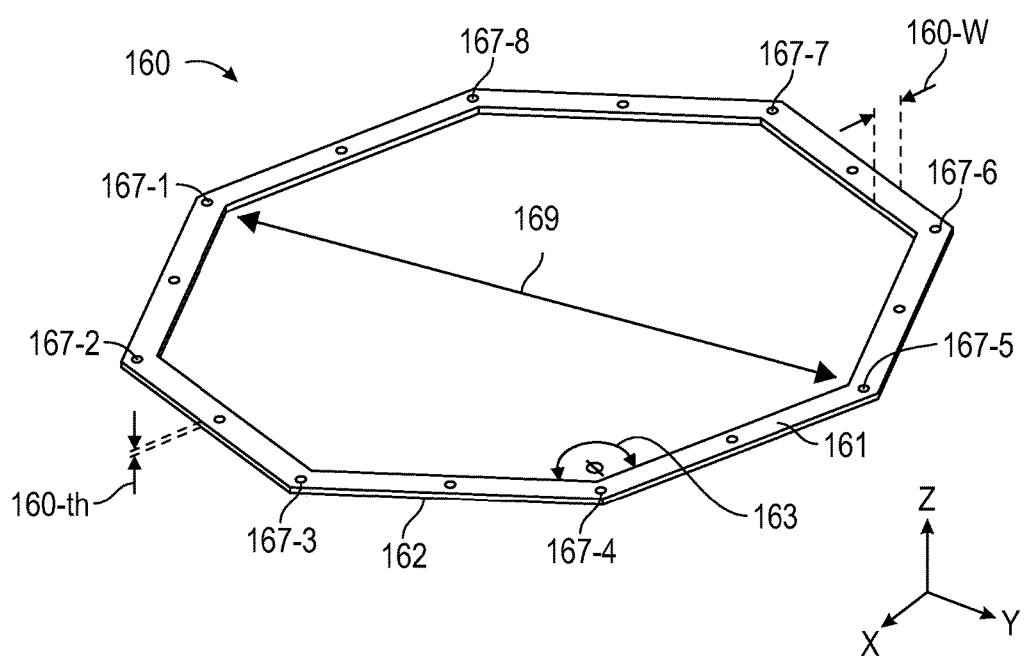
FIG. 3 shows an exemplary mental ring to which a dome is anchored, in accordance with an exemplary embodiment of the present invention.

FIG. 3 shows an exemplary mental ring to which a dome is anchored, in accordance with an exemplary embodiment of the present invention. Turning to FIG. 3, the metal ring 160 has an octagon shape forming internal angles 163 degrees of 135 degrees. The octagon ring 160 has a width 160-W and a thickness 160-th. In accordance with an exemplary embodiment the width 160-W is 1.5 centimeters. In accordance with an exemplary embodiment, the thickness 160-th is 2 millimeters. In accordance with the exemplary embodiment, the diameter 169 of the octagon ring 160 is 24 centimeters. In accordance with an exemplary embodiment, a hole 167-1 to 167-8 is disposed in each octagon vertices, 164-1 and 164-2 for example, for securing of anchors therein. In accordance with an alternate embodiment, the ring 160 is a fairly ridged non-metal material. The ring 160 has an under side 162 and a top side 161 which may be smooth or textured, in accordance with an exemplary embodiment. In accordance with yet an alternate embodiment, the ring is other than an octagon shape.

Figure 4A:
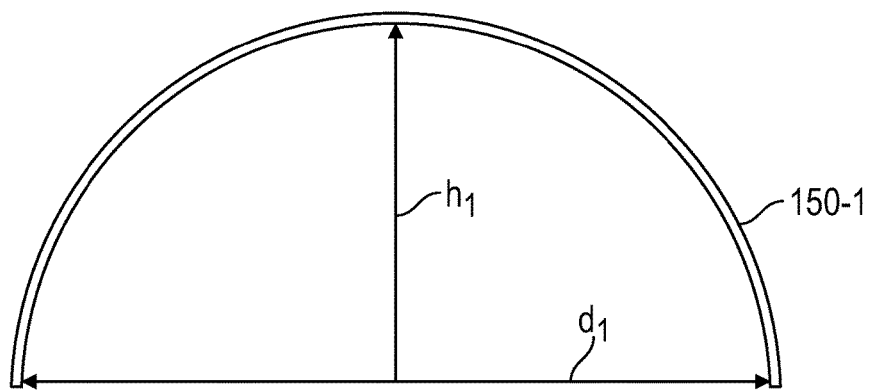
FIG. 4A shows an exemplary bent wire, in accordance with an exemplary embodiment of the present invention.
Figure 4B:
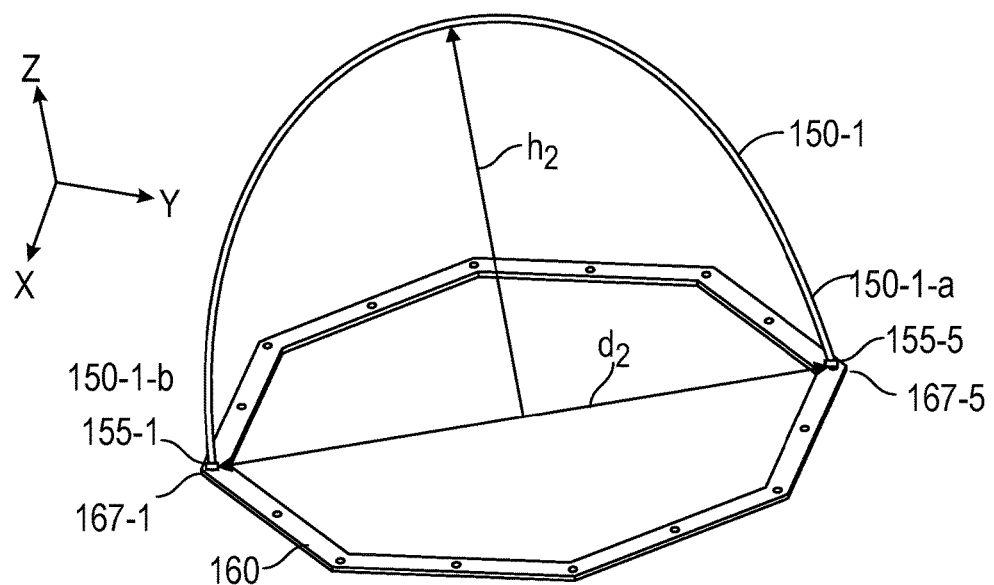
FIG. 4B shows a front view of a wire secured to a metal ring, in accordance with an exemplary embodiment of the present invention.

FIG. 4A shows an exemplary bent wire, in accordance with an exemplary embodiment of the present invention and FIG. 4B shows a front view of a wire secured to a metal ring, in accordance with an exemplary embodiment of the present invention. Turning first to FIG. 4A, a wire 150-1 is bent into a semi-circle with diameter d1. The bent wire 150-1 has a height, h1, or radius. The same wire 150-1 is shown anchored across a metal octagon ring in FIG. 4B. Turning to FIG. 4B, a first end 150-1-a of wire 150-1 is anchored to the octagon circumference by a fastener 155-5. In accordance with an exemplary embodiment the fasteners for securing the wires to a desired frame are crimp ferrules. The second end 150-1-b of the wire 150-1 is anchored using a fastener 155-1. The anchors 155-5, 155-1 are secured to a frame 160 at vertices 164-1 and 164-4. In accordance to the exemplary embodiment shown in FIG. 4B, the frame 160 is flat octagon. Once anchored onto the frame 160, a wire 150-1 has a height h2 and a diameter d2. In accordance with an exemplary embodiment, the unanchored height h1 is less than the anchored height h2. The unanchored diameter d1 of the bent wire 150 is greater than the anchored diameter d2.

Figure 5:
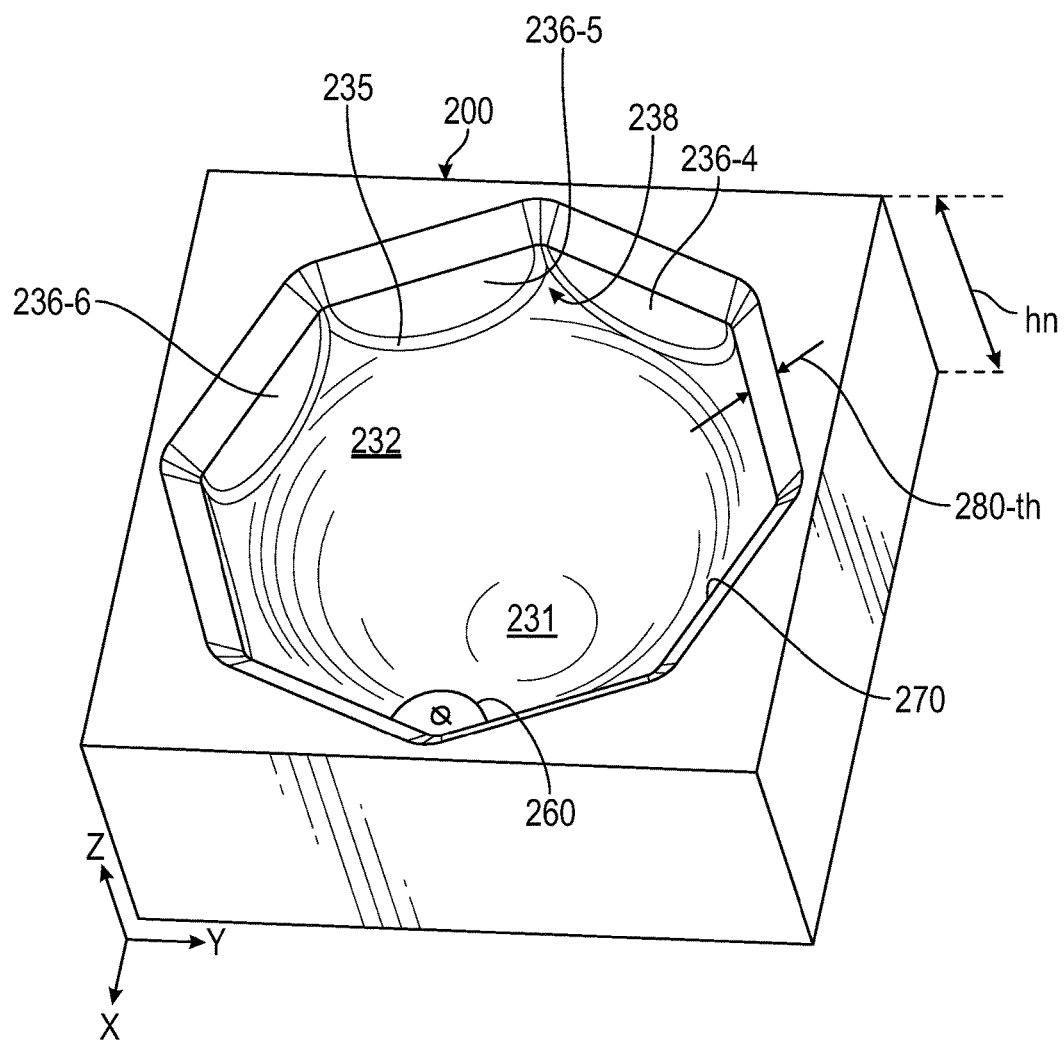
FIG. 5 is an exemplary mold used for forming a sensor node base, in accordance with an exemplary embodiment of the present invention.

FIG. 5 is an exemplary mold used for forming a sensor node base, in accordance with an exemplary embodiment of the present invention. Turning to FIG. 5, a flat bottom 231 in the mold 200 provides a flat bottom centered outer surface on the molded sensor node base. The flat bottom 231 rises in a curve 232 to form flat sidewalls, where sidewalls 236-6, 236-5, and 236-4 can be seen in this view. In accordance with the exemplary embodiment of FIG. 5, the mold transitions from a spherical concave 232 with a flat bottom 231 into an octagon shape with interior angles 260 of 135 degrees. A chamfer 235 is built into the transition step from the spherical portion to the vertical Z side walls. A vertex 238 between adjacent sidewalls, 236-5 and 236-4 is also chamfered. A top edge +Z has a thickness 180-th. And finally the height, hn of the mold accommodates a finished sensor base of near 8 centimeters.

Figure 6:
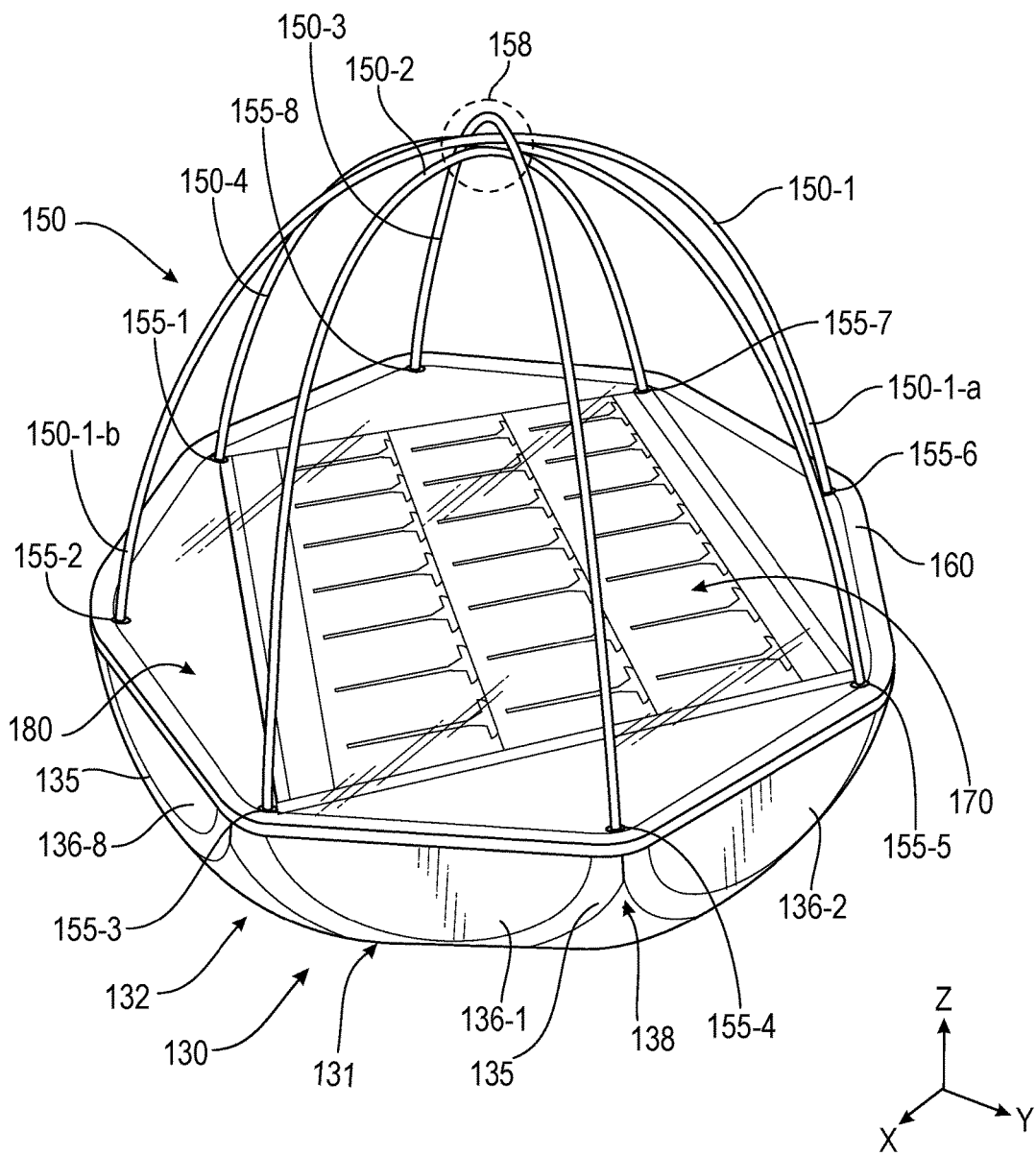
FIG. 6 shows a digital image from a top front perspective view of a terrain sensor node, in accordance with an exemplary embodiment of the present invention.

FIG. 6 shows a digital image from a top front perspective view of a terrain sensor node, in accordance with an exemplary embodiment of the present invention. Turning to FIG. 6, dome 150 is made from four wires 150-1-150-4 that cross across a top center 158. In accordance to an exemplary embodiment, the wires 150-1-150-4 are juxtaposition touching at least one wire above or below, respectively, at top dead center 158. Each side of each wire is anchored at its ends; for example, wire 150-1 is shown anchored at a first end 150-1-a into anchor 155-6 and second end 150-1-b is secured using anchor 155-2. In like manner, one of each end of each wire is secured to anchors 155-3 to 155-6 and 155-7 to 155-1 180 degrees across the circumference of the base 130. Under the dome 150 is solar panel 170. The solar panel 170 fits within the outer edges of the wire dome 150. Turning to the base 130, a flat bottom center 131 is visible in this view. Moving upwards +Z from the flat bottom 131 is a curved or spherical portion 132. From its spherical portion 132, the base 130 rises into straight sidewalls in an octagon shape, where sides 136-8, 136-1, and 136-2 are visible. The surface at the spherical 132 to straight sidewalls 136 are chamfered 135. The vertex 138 at each sidewall joint is chamfered 135 as well. Atop +Z of the base 130 is a clear coating 180 covering the solar panel 170.

Figure 7A:
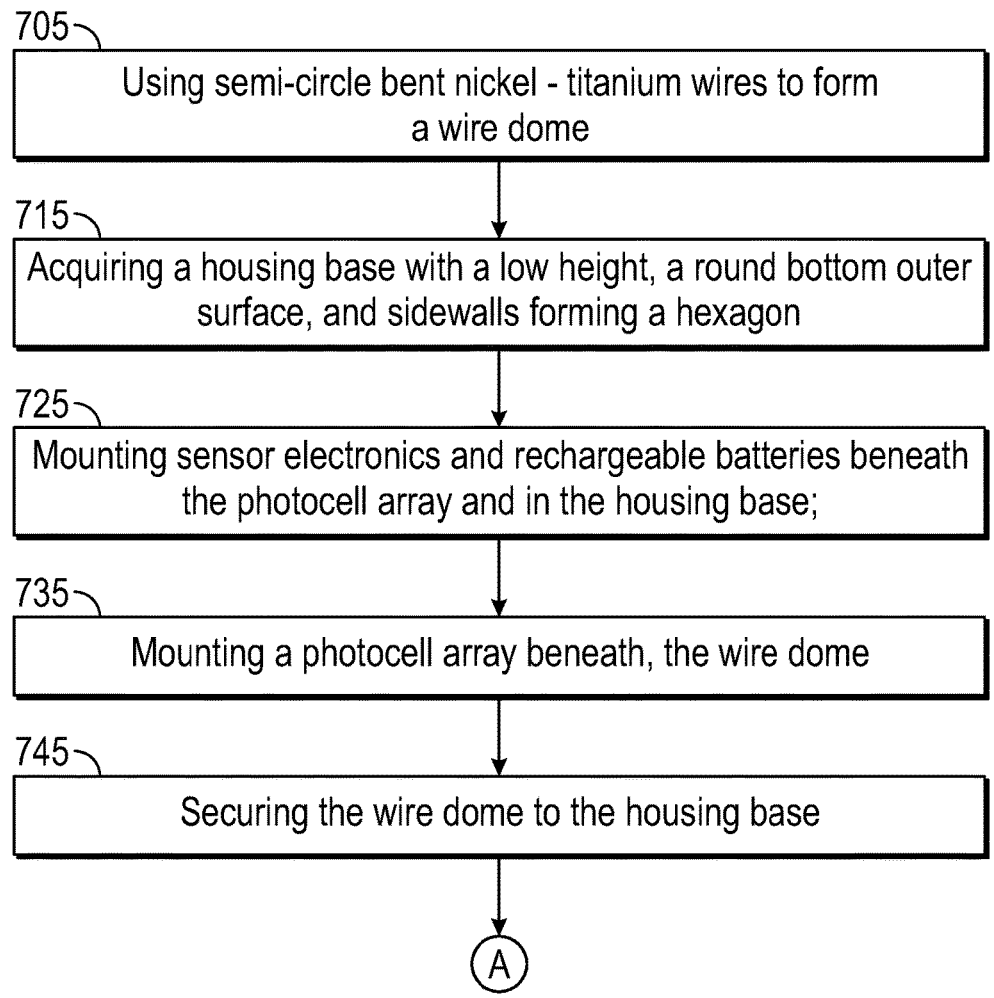
FIG. 7A shows an exemplary method of housing a terrain sensor node, in accordance with an exemplary embodiment of the present invention.

FIG. 7A shows an exemplary method of housing a terrain sensor node assembly, in accordance with an exemplary embodiment of the present invention. Turning to FIG. 7A, the method includes: using a semi-circle bent nickel-titanium alloy wires to form a wire dome 705; acquiring a housing base with a low height, a round bottom outer surface, and sidewalls forming a hexagon 715; mounting sensor electronics and rechargeable batteries beneath the solar cell array and in the housing base; 725; mounting a solar cell array beneath the wired dome 735; and securing the wire dome to the housing base 745. In accordance with alternate embodiments, a shape with a greater number of sides than eight may be used. In accordance with another exemplary embodiment, the base has a flat centered bottom.

Figure 7B:
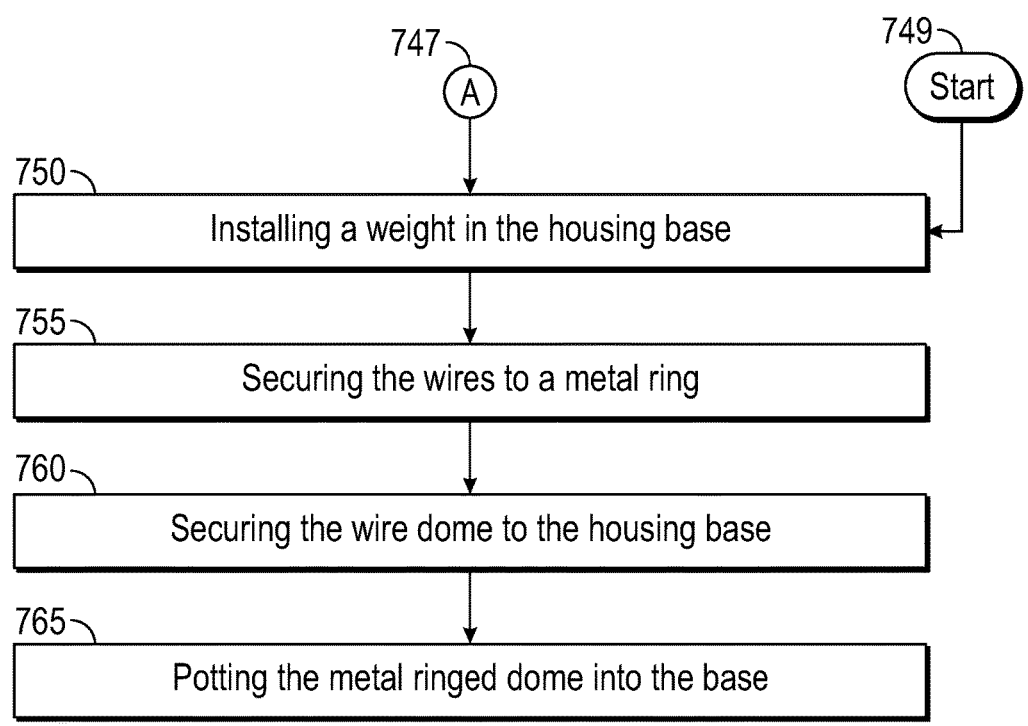
FIG. 7B shows another exemplary method of housing a terrain sensor node, in accordance with another exemplary embodiment of the present invention.

FIG. 7B shows another exemplary method of housing a terrain sensor node, in accordance with another exemplary embodiment of the present invention. Turning to FIG. 7B, the method may include the method in accordance with FIG. 7A 747. In the alternative, the method may begin in FIG. 7B 749 and includes: installing a weight in the housing base 750; securing the wires to a metal ring 755; securing the wired dome to the housing base 760; and potting the metal ringed dome into the base 765. In accordance with exemplary embodiment, the method of housing a terrain sensor node includes formation of the dome in FIG. 7A 747. In still alternate embodiments, the method of housing need not include the formation of the wire dome 749.

Figure 8A:
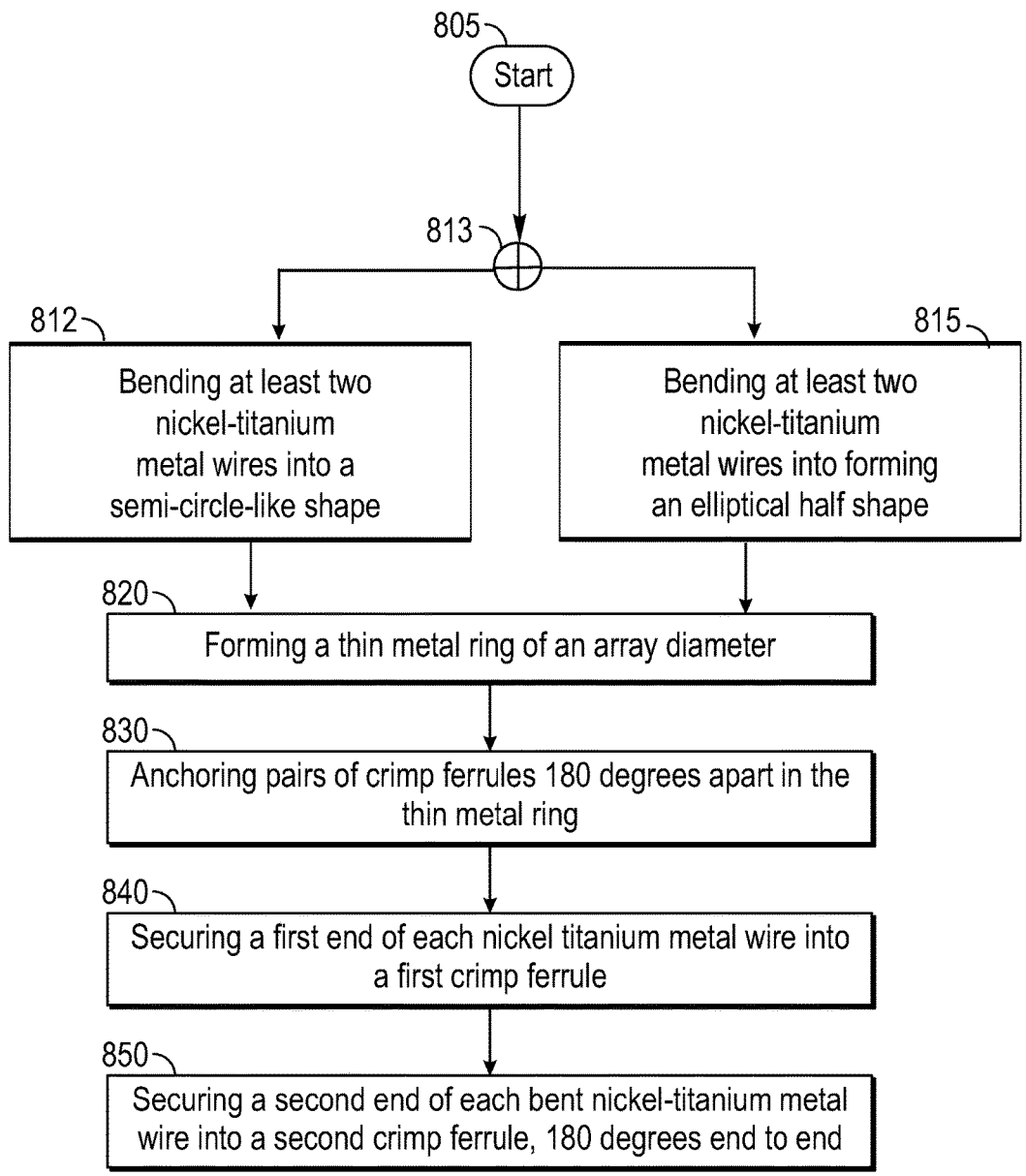
FIG. 8A shows an exemplary method of manufacturing a terrain sensor node, in accordance with an exemplary embodiment of the present invention.

FIG. 8A shows an exemplary method of manufacturing a terrain sensor node, in accordance with an exemplary embodiment of the present invention. Turning to FIG. 8A, the method may start 810 with bending of at least two nickel-titanium alloy wires into a semi-circle shape 812 or 813 bending of at least two nickel-titanium alloy wires into an elliptical shape 815. In accordance with the exemplary embodiment in FIG. 8A, the method further includes: forming a thin metal ring of an array diameter 820; anchoring pairs of crimp ferrules 180 degrees part in the thin metal ring 830; securing a first end of each nickel-titanium alloy wire into a first crimp ferrule 840; and securing a second end of each bent nickel-titanium metal wire into a second crimp ferrule, 180 degrees end to end 850.

Figure 8B:
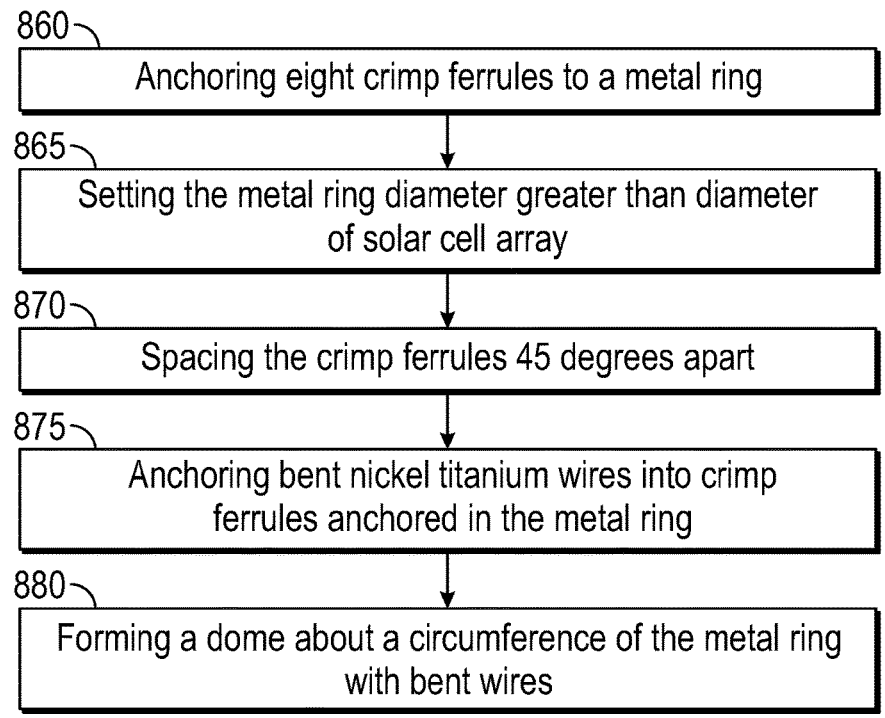
FIG. 8B shows another exemplary method of manufacturing a terrain sensor node, in accordance with another exemplary embodiment of the present invention.

FIG. 8B shows another exemplary method of manufacturing a terrain sensor node, in accordance with another exemplary embodiment of the present invention. Turning to FIG. 8B, the method includes: anchoring eight crimp ferrules to a metal ring 860; setting the metal ring diameter greater than diameter of solar cell array 865; spacing the crimp ferrules 45 degrees apart 870; anchoring bent nickel-titanium alloy wires into to crimp ferrules anchored in the metal ring 875; and forming a dome about a circumference of the metal ring with bent wires 880. In accordance with an alternate embodiment greater than four wires are used to form the dome and more than eight corresponding crimp ferrules are evenly spaced about 360 degrees. In accordance with an exemplary embodiment the metal ring is an octagon. In accordance with another exemplary embodiment, the metal ring is a circular shape.

Figure 8C:
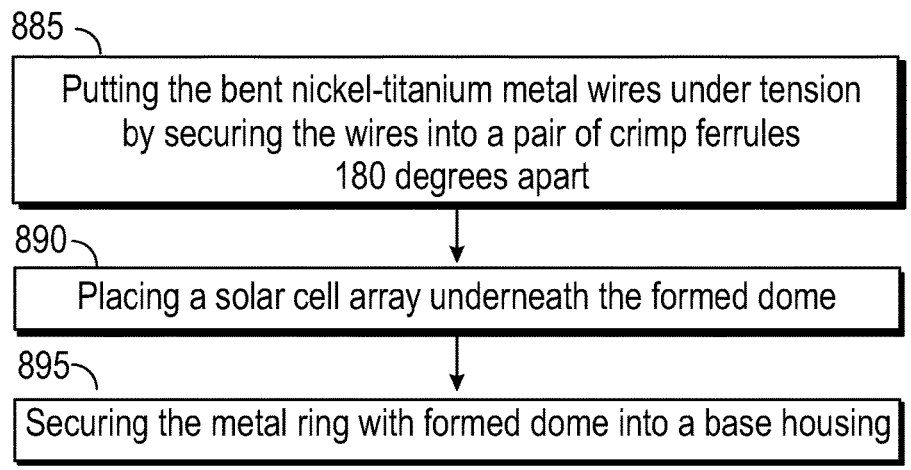
FIG. 8C shows another exemplary method of manufacturing a terrain sensor node, in accordance with another exemplary embodiment of the present invention.

FIG. 8C shows another exemplary method of manufacturing a terrain sensor node, in accordance with another exemplary embodiment of the present invention. Turning to FIG. 8C, the method includes: putting the bent nickel-titanium alloy wires under tension by securing the wire s into the metal ring at 180 degrees across the ring 885; placing a solar cell or an array of solar cells underneath the formed dome 890; and securing the metal ring with formed dome into a base housing 895. In accordance with another exemplary embodiment, the wires may be secured into the metal ring via crimp ferrules. In accordance with an alternate embodiment, an alternate fastener secures the bent wires to the ring. In accordance with an exemplary embodiment, the metal ring is a circular shape, and in another embodiment the ring is an octagon shape, in still another embodiment the ring is a polygon of greater than eight equal sides.

Figure 9A:
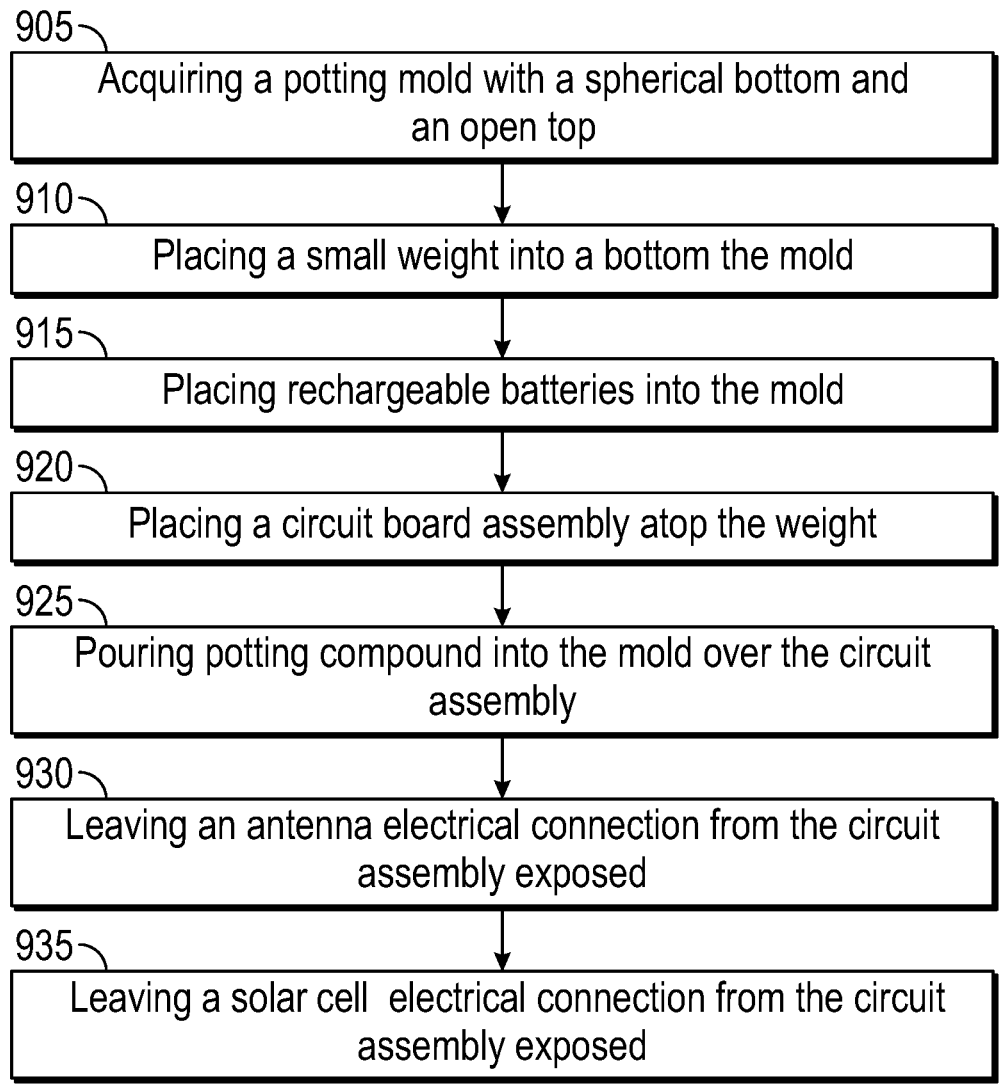
FIG. 9A shows a method of manufacturing a terrain sensor node, in accordance with an exemplary embodiment of the present invention.

FIG. 9A shows a method of manufacturing a terrain sensor node, in accordance with an exemplary embodiment of the present invention. Turning to FIG. 9A, the method includes: acquiring a potting mold with a spherical bottom and an open top 905; placing a small weight into a bottom the mold 910; placing rechargeable batteries into the mold 915; placing a circuit board assembly atop the weight 930; pouring potting compound into the mold over the circuit assembly 925; leaving an antenna electrical connection from the circuit assembly exposed 930; and leaving a solar cell electrical connection from the circuit assemble exposed 935. In accordance with an exemplary embodiment, the weight is place at a height, +Z in FIG. 6, to make a center of mass of the sensor assembly below a mid-base height.

Figure 9B:
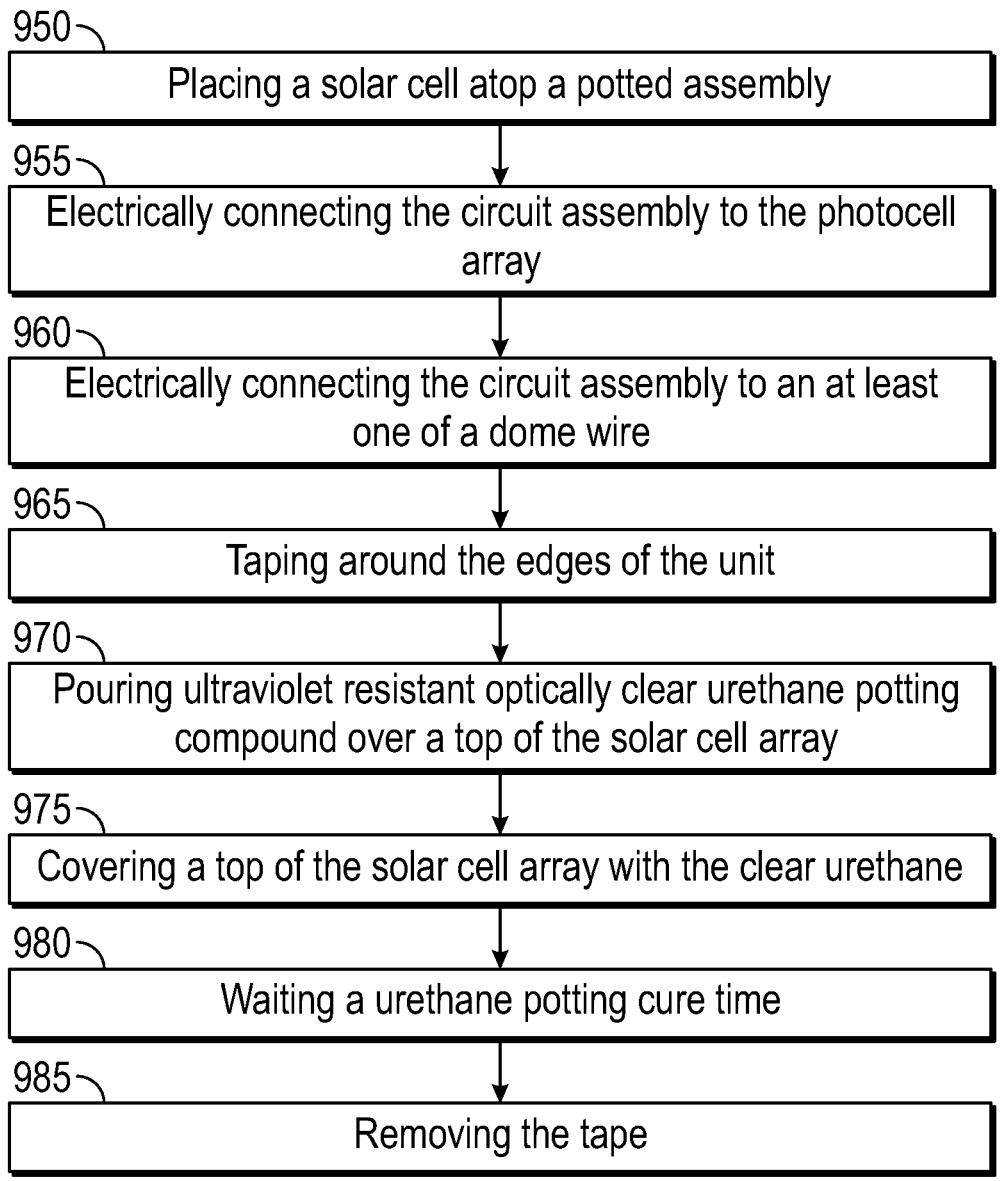
FIG. 9B shows a method of manufacturing a terrain sensor node, in accordance with an exemplary embodiment of the present invention.

FIG. 9B shows a method of manufacturing a terrain sensor node, in accordance with an exemplary embodiment of the present invention. Turning to FIG. 9B, the method includes: placing a solar cell atop a potted assembly 950; electrically connecting the circuit assembly to the solar cell array 955; electrically connecting the circuit assembly to an at least one of a dome wire 960; taping around the edges of the base unit 965; pouring ultraviolet resistant optically clear urethane potting compound over atop of the solar cell array 970; covering a top of the solar cell array with the clear urethane 975; waiting a urethane potting cure time 980; and removing the tape 985.

Figure 10:
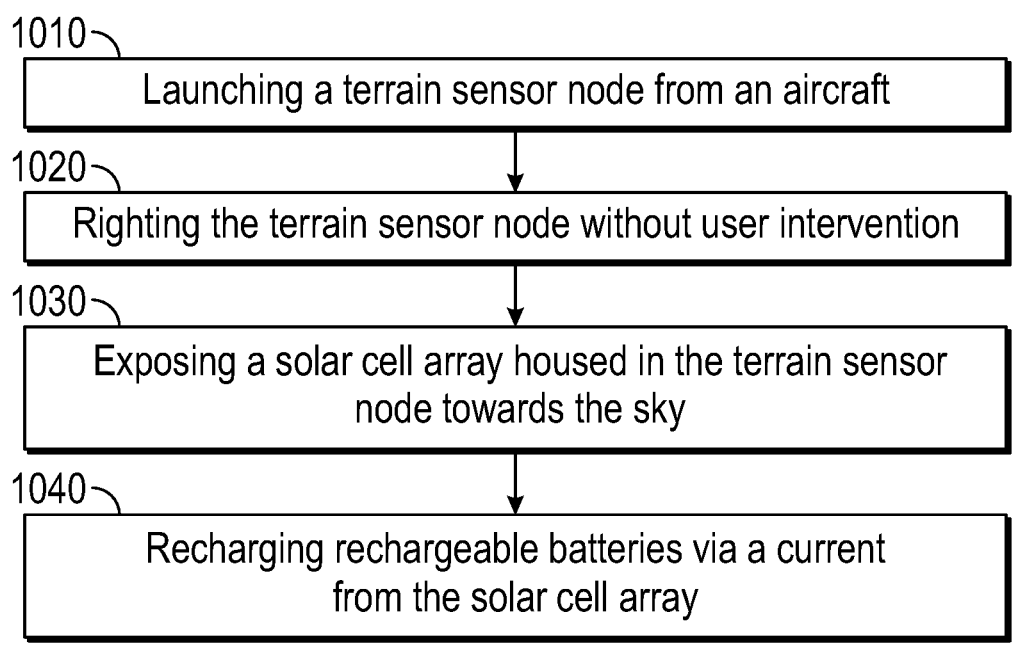
FIG. 10 shows a method of recharging batteries in a remote terrain sensor node, in accordance with an exemplary embodiment of the present invention.

FIG. 10 shows a method of recharging batteries in a remote terrain sensor node, in accordance with an exemplary embodiment of the present invention. Turning to FIG. 10, the method includes: launching a terrain sensor node from an aircraft 1010; righting the terrain sensor node without user intervention 1020; exposing a solar cell array housed in the terrain sensor node towards the sky 1030; and recharging rechargeable batteries via a current from the solar cell array 1040.

The present invention does not require placement by the user in field applications, nor is mounting or anchoring required. Remote reliable service is provided with solar recharging of rechargeable batteries. FIG. 1 is a perspective view of a terrain sensor node, in accordance with an exemplary embodiment of the present invention.

Perimeter and security sensor systems conventionally employ hands on installation. For security systems in challenging terrain, remote locations, hazardous environments, or in a widespread geographic region, such installation may unduly expensive or nearly impossible. Having the capability to aerially drop wireless sensors can alleviate these issues. However, it is challenging to design sensors that can survive being aerially dropped and come to rest in an orientation that works well for wireless transmission and for solar charging of the batteries. Embodiments of the present invention provide a mechanical design for a terrain sensor node that is robust enough to survive being aerially dropped. Further embodiments of the present invention will self-right to an upright position. In turn, the present sensor node, facilitates both wireless communication and solar charging of batteries.

In accordance with an exemplary embodiment of the present invention, Nitinol wires form a protective dome top on the sensor assembly. In accordance with an exemplary embodiment, four wires are used. Each is bent to a rounded shape. Opposite ends may be secured to a set shape to be separated by 45 degrees when anchored. In accordance with an exemplary embodiment an octagon shape is used to anchor the wires. Crimp ferrules may be used to secure the wires to the fixed shape. The wires may be bent into a semi-circle, or an elliptical like shape. Wires are bent, formed into a shape just wider or narrower than their final anchored shape. In turn, said wires are under tension when secured to the fixed shape. FIG. 4B shows an example of a fixed shape, in accordance with an exemplary embodiment.

In accordance with an exemplary embodiment a weight may be added to the base. The weight is sized and positioned to lower the centroid of the total sensor assembly, to be low in the base. A low center of gravity, or low center of mass, will assist in righting the sensor assembly with its solar array pointing skyward. A wire cage, or dome, assembly is placed into the potting mold. A highly impact resistant potting compound is poured or injected into the potting mold until the level of the potting just covers the top of the metal ring of the wire cage subassembly, in accordance with an exemplary embodiment. At least two connecting wires from the circuit card assembly are left extending from the potting compound, from the potted base. One or more wires can later be soldered to the solar panel. Another of the exposed wires or more, can be connected to at least one of the Nitinol wires. Once the potting cures, the assembly can be removed from the mold. A potting compound protects the circuit card assembly, batteries and other devices housed in the base. The base protects its contacts from the landing impact. In accordance with an exemplary embodiment the sensor assembly falls in an upright orientation, with its base taking the brunt of the landing impact.

In accordance with an exemplary embodiment the base 130, shown for example in FIG. 1, is made from urethane. Urethane also provides the potting compound, in accordance with an exemplary embodiment of the present invention.

In accordance with an exemplary embodiment, a solar panel 170 is placed on top of the cured urethane potting, shown for example in FIG. 6. The wire leads for the solar panel may then be cut to length, stripped, and soldered to the solar panel, providing, at least, electrical connection from the solar panel to the circuit card assembly. In similar fashion, the wire leads for the antenna may then be cut to length, stripped, and soldered to each end of a Nitinol wire.

After positioning of the solar array and electrical connection of the same, additional potting can complete the terrain sensor node assembly, in accordance with an exemplary embodiment. In accordance with an exemplary embodiment, an ultraviolet a UV resistant optically clear coat 180 is added atop the solar array, shown for example in FIG. 6.

In accordance with another exemplary embodiment, after solar array placement, tape is affixed around the edges of the unit and then a UV resistant optically clear urethane potting compound is poured over the top of the solar panel until it is fully covered. Once the potting cures, the tape may be removed and the sensor node assembly is complete. The UV resistant potting compound resists yellowing over time so that the solar panel continues to provide power for charging the batteries. It also protects the solar panel and wires from the elements, e.g. weather.

The present invention utilizes both custom made parts and off the shelf parts reducing supply costs as compared to a fully customized composition.

Nitinol wire is resilient, it provides a flexible dome structure that is difficult to permanently bend or damage. In accordance with an exemplary embodiment of the present invention, each wire is under tension, once installed. The dome cage is light weight yet indestructible in nature. The dome-shaped cover protects the sensor node during landing impact while permitting sunlight to reach the solar panels. In accordance with an exemplary embodiment there are 4 super-elastic Nitinol metal wires bent in the shape of a semicircle and then secured to a metal ring, such as FIG. 3, with crimp ferrules near the corners of the metal ring. The dome shape, along with the low center of gravity of the unit, contribute to the self-righting capacity of the node assembly. This wire cage subassembly contributes to survivability of the assembly to withstand aerial deployment and landing. Another function of the wire cage assembly may be that one of the Nitinol wires will later be soldered to regular wires coming from the circuit card assembly and will then also act as an antenna for the sensor node.

While specific alternatives to steps of the invention have been described herein, additional alternatives not specifically disclosed but known in the art are intended to fall within the scope of the invention. Thus, it is understood that other applications of the present invention will be apparent to those skilled in the art upon reading the described embodiments and after consideration of the appended drawings.

What is claimed is:

1. A method of housing a terrain sensor node, the method comprising:
   using semi-circle bent nickel-titanium wires to form a wire dome;
   acquiring a housing base with a low height, a round bottom outer surface, and sidewalls forming a octagon;
   mounting sensor electronics and rechargeable batteries beneath the solar cell array and in the housing base;
   mounting a solar cell array beneath, the wire dome; and
   securing the wire dome to the housing base.

2. The method according to claim 1, further comprising:
   installing a weight in the housing base.

3. The method according to claim 1, further comprising:
   securing the wires to a metal ring; and
   wherein, securing the wire dome to the housing base includes potting the metal ringed dome into the base.

4. The method according to claim 1, wherein:
   the sensor electronics includes a circuit card assembly.

5. A method of manufacturing a terrain sensor node, the method comprising:
   bending at least two nickel-titanium metal wires into a semi-circle-like shape;
   forming a thin metal ring of an array diameter;
   anchoring at least two crimp ferrules 180 degrees apart in the thin metal ring;
   securing a first end of at least one of the at least two bent nickel titanium metal wires into a first crimp ferrule; and
   securing a second end of the at least one of the at least two bent nickel-titanium metal wires into a second crimp ferrule.

6. The method according to claim 5, wherein:
   bending of the wires forms an elliptical half shape.

7. The method according to claim 5, further comprising:
   anchoring eight crimp ferrules to a metal ring.

8. The method according to claim 5, wherein:
   the array diameter is greater than a diameter of a solar cell array.

9. The method according to claim 7, further comprising:
   spacing the crimp ferrules 45 degrees apart.

10. The method according to claim 5, further comprising:
    forming a dome about a circumference of the metal ring using bent nickel titanium wires secured to crimp ferrules anchored in the metal ring.

11. The method according to claim 10, further comprising:
    securing the metal ring with formed dome into a base housing.

12. The method according to claim 11, further comprising:
    placing a solar cell array underneath the formed dome.

13. The method according to claim 5, wherein:
    putting the at least one of the two bent nickel-titanium metal wires under tension by securing a second end of the at least one of the two bent nickel-titanium metal wires into a second crimp ferrule.

14. The method according to claim 5, further comprising:
    bending four nickel-titanium wires into a semi-circle shape.

15. A method of manufacturing a terrain sensor node, the method comprising:
    acquiring a potting mold with a spherical bottom and an open top;
    placing a weight into a bottom of the mold;
    placing rechargeable batteries into the mold placing a circuit board assembly atop the weight;
    pouring potting compound into the mold over the circuit assembly and beneath an uppermost level of the mold;
    leaving an antenna electrical connection from the circuit assembly exposed; and
    leaving a solar cell electrical connection from the circuit assembly exposed.

16. The method according to claim 15, further comprising:
    injection molding the potting compound into the mold or pouring the potting compound into the mold.

17. The method according to claim 15, further comprising:
    using a highly impact resistant potting compound.

18. The method according to claim 15, further comprising:
    placing a metal ring with the formed wire dome mounted thereto into the mold;
    pouring potting compound to just cover the metal ring; and
    forming a potted assembly.

19. The method according to claim 18, further comprising:
    awaiting a potting cure time.

20. The method according to claim 19, further comprising:
    removing the formed potted assembly from the mold.

21. The method according to claim 15, wherein:
    using urethane potting compound.

22. A method of manufacturing a terrain node, the method comprising:
    placing a solar cell atop a potted assembly;
    electrically connecting the circuit assembly to the solar cell array; and
    electrically connecting the circuit assembly to an at least one of a dome wire.

23. The method according to claim 22, further comprising:
    taping around the edges of the unit;
    pouring ultraviolet resistant optically clear urethane potting compound over a top of photo cell array;
    covering a top of the solar cell array with the clear urethane.

24. The method according to claim 23, further comprising:
    waiting a urethane potting cure time; and
    removing the tape.

25. A method of recharging batteries in a remote terrain node, the method comprising:
    launching a terrain sensor node from an aircraft;
    righting the terrain sensor node without user intervention;
    exposing a solar cell array housed in the terrain sensor node towards the sky; and
    recharging rechargeable batteries via a current from the solar cell array.

26. A terrain sensor node, the device comprising:
    a wire dome top;
    the wired dome top secured to a polymer base;
    a solar panel secured to the polymer base and beneath the wired dome top.

27. The device according to claim 26, further comprising:
    the polymer base comprising:
    a curved outer bottom surface in three dimensions.

28. The device according to claim 27, further comprising:
    sidewalls integral to the polymer base and forming a octagon.

29. The device according to claim 26, further comprising:
a weight nearly centered in the cross sectional horizontal plane, position at lower than half the base height, and housed in the base.

30. The device according to claim 26, wherein:
the polymer is urethane.

31. The device according to claim 26, further comprising:
the wire dome top comprising:
NITINOL wires under tension.

32. The device according to claim 26, further comprising:
sensors and a circuit card assembly housed in the base.

33. The device according to claim 32, further comprising:
at least one rechargeable battery electrically connected to the circuit card assembly.

34. The device according to claim 33, further comprising:
at least 4 nickel-titanium wires under tension.

35. The device according to claim 34, further comprising:
a thin metal ring having a diameter near a base diameter.

36. The device according to claim 35, further comprising crimp ferrules anchored to the thin metal ring.

37. The device according to claim 36, further comprising:
wires secured under tensions to the metal ring via the anchored crimp ferrules.

38. The device according to claim 37, further comprising:
a urethane coating over the solar panel.

39. The device according to claim 36, further comprising:
an ultraviolet protection coating over the solar cell.

40. A method of manufacturing a terrain sensor node, the method comprising:
acquiring a potting mold with a spherical bottom and an open top;
placing rechargeable batteries into the mold
placing a circuit board assembly atop the weight;
pouring potting compound into the mold over the circuit assembly and beneath an uppermost level of the mold; and
lowering a centroid to a below a bottom half of the sensor node base or lower.

41. A method of self-righting a sensor assembly, the method comprising:
using a rounded bottom housing; and
lowering a centroid of the sensor assembly to the beneath a base sidewall.

* * * * *